(12) United States Patent
McCune et al.

(10) Patent No.: US 8,899,916 B2
(45) Date of Patent: Dec. 2, 2014

(54) TORQUE FRAME AND ASYMMETRIC JOURNAL BEARING FOR FAN DRIVE GEAR SYSTEM

(75) Inventors: Michael E. McCune, Colchester, CT (US); William G. Sheridan, Southington, CT (US)

(73) Assignee: United Technologies Corporation, Hartford, CT (US)

( * ) Notice: Subject to any disclaimer, the term of this patent is extended or adjusted under 35 U.S.C. 154(b) by 613 days.

(21) Appl. No.: 13/221,087

(22) Filed: Aug. 30, 2011

(65) Prior Publication Data

US 2013/0051984 A1  Feb. 28, 2013

(51) Int. Cl.
*F01D 15/12* (2006.01)
*F02C 7/36* (2006.01)
*F02K 3/04* (2006.01)

(52) U.S. Cl.
CPC ... *F02K 3/04* (2013.01); *F02C 7/36* (2013.01); *F05D 2260/40311* (2013.01); *F05D 2220/36* (2013.01)
USPC .................................. 415/124.1; 416/170 R

(58) Field of Classification Search
USPC ........ 415/112, 124.1, 229, 122.1; 416/170 R, 416/204 R
See application file for complete search history.

(56) References Cited

U.S. PATENT DOCUMENTS

| | | | |
|---|---|---|---|
| 3,808,913 A | 5/1974 | Gilbert et al. | |
| 4,025,134 A | 5/1977 | Reisacher | |
| 4,497,587 A | 2/1985 | Pine | |
| 6,422,971 B1 | 7/2002 | Katou et al. | |
| 6,964,155 B2 * | 11/2005 | McCune et al. | 60/226.1 |
| 7,104,918 B2 | 9/2006 | Mitrovic | |
| 7,223,197 B2 | 5/2007 | Poulin et al. | |
| 7,704,178 B2 | 4/2010 | Sheridan et al. | |
| 7,824,305 B2 | 11/2010 | Duong et al. | |
| 7,883,439 B2 | 2/2011 | Sheridan et al. | |
| 7,926,260 B2 | 4/2011 | Sheridan et al. | |
| 7,950,151 B2 | 5/2011 | Duong et al. | |
| 2010/0212281 A1 * | 8/2010 | Sheridan | 60/39.08 |
| 2010/0317477 A1 | 12/2010 | Sheridan et al. | |
| 2010/0317478 A1 | 12/2010 | McCune et al. | |
| 2010/0331140 A1 | 12/2010 | McCune | |

* cited by examiner

*Primary Examiner* — Edward Look
*Assistant Examiner* — Juan G Flores
(74) *Attorney, Agent, or Firm* — Kinney & Lange, P.A.

(57) ABSTRACT

A fan drive gear system for a gas turbine engine includes a torque frame and a journal bearing. The torque frame has an arm that extends therefrom, the journal bearing is mounted on the arm. When the fan drive gear system is in an unloaded condition an outer circumferential surface of the journal bearing is disposed at an angle so that it is non-parallel with respect to an axis of the arm. When the fan drive gear system is in a loaded condition the outer circumferential surface is disposed substantially parallel to the axis of the arm. In another aspect, the journal bearing includes a main body, a first wing, and a second wing. The first and second wings extend from the main body and are asymmetric with respect to one another.

19 Claims, 4 Drawing Sheets

US 8,899,916 B2

TORQUE FRAME AND ASYMMETRIC JOURNAL BEARING FOR FAN DRIVE GEAR SYSTEM

BACKGROUND

The invention relates to gas turbine engines, and more particularly, to a fan drive gear system for gas turbine engines.

One type of gas turbine engine includes a fan drive gear system that couples turbo-machinery of the engine with the fan. Typical turbo-machinery includes two axially extending concentric shafts. The two shafts rotate at different speeds and couple the high pressure compressor with the high pressure turbine and the low pressure compressor with the low pressure turbine. Typically, one of the shafts (typically the low rotor shaft) additionally drives the fan, via the fan drive gear system. The fan acts to compress and move air through a nacelle of the gas turbine engine. In this manner, a substantial portion of the thrust of the gas turbine engine is generated.

Fan drive gear systems may utilize an epicyclic gear train which includes a sun gear that is driven by the low rotor shaft, planet gears which are circumferentially arranged about and intermesh with the sun gear and a ring gear that is disposed about and intermeshes with the planet gears. Depending upon the configuration, either the planet gears or the ring gear rotationally drive the fan in response to rotation of the sun gear.

Typically in epicyclic gear trains each planet gear is supported on and rotates relative to one journal bearing. Each journal bearing extends between and is supported at either axial end by a carrier. The carrier is bolted to a torque frame, which is secured to a fixed structure or rotating structure depending upon the particular configuration of the gear system.

Unfortunately, the configuration of the carrier (supporting the journal bearings at either end) and the dense high strength alloys typically used for the carrier contributes unwanted weight to the gas turbine engine.

SUMMARY

A fan drive gear system for a gas turbine engine includes a torque frame and a journal bearing. The torque frame has an arm that extends therefrom. The journal bearing is mounted on the arm and has an outer circumferential surface. When the fan drive gear system is in an unloaded condition, the outer circumferential surface of the journal bearing is disposed at an angle that is non-parallel with respect to an axis of the arm. When the fan drive gear system is in a loaded condition, the outer circumferential surface is disposed substantially parallel to the axis of the arm.

A fan drive gear system for a gas turbine engine includes a torque frame and a journal bearing. The torque frame has an arm that extends therefrom, the journal bearing is mounted on the arm. The journal bearing includes a main body, a first wing, and a second wing. The main body has an inner radial surface that interfaces with the arm. The first wing extends from a first side of the main body and the second wing extends from a second opposing side of the main body. The first and second wings are asymmetric with respect to one another.

A gas turbine engine includes a low pressure turbine, a low pressure shaft coupled to the low pressure turbine, and a fan drive gear system coupled to the low pressure shaft. The fan drive gear system has a journal bearing mounted to an arm of a torque frame. At least one of the journal bearing and the torque frame is configured to have one or more features that account for a deflection of the fan drive gear system in a loaded condition to align an outer surface of the journal bearing with an axis of the arm.

DETAILED DESCRIPTION

Figure 1:
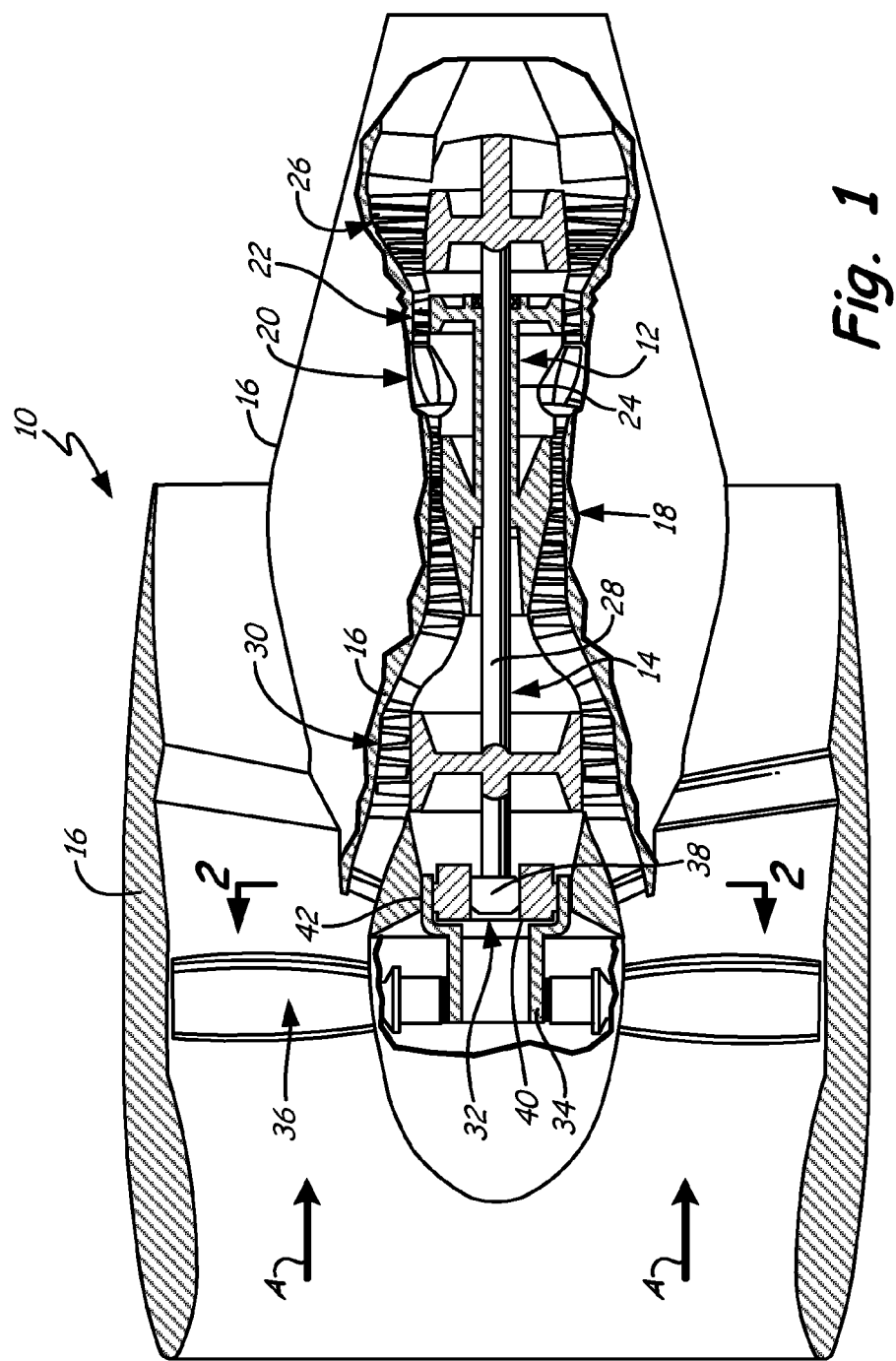
FIG. 1 is a schematic representation of one embodiment of a gas turbine engine.

FIG. 1 shows a schematic representation of one embodiment of a gas turbine engine 10. Gas turbine engine 10 includes a high pressure spool 12, a low pressure spool 14, and a casing 16. High pressure spool 12 includes a high pressure compressor 18, a combustor 20, a high pressure turbine 22, and a high pressure shaft 24. Low pressure spool 14 includes a low pressure turbine 26, a low pressure shaft 28, a low pressure compressor 30, a fan drive gear system 32, a fan shaft 34, and a fan 36. Fan drive gear system 32 includes a sun gear 38, planet gears 40, and a ring gear 42.

The general construction and operation of gas turbine engines is well-known in the art, and therefore will not be discussed in great detail. As shown in FIG. 1, high pressure spool 12 and low pressure spool 14 are supported and allowed to rotate by bearings (not shown) and struts (not shown) within stator casing 16. High pressure spool 12 and low pressure spool 14 are arranged in flow communication with one another within casing 16.

As shown in FIG. 1, high pressure spool 12 is of conventional construction and operates in a conventional manner. Thus, high pressure compressor 18 is arranged downstream of forward portions of low pressure spool 14 as indicated by flow arrow A. High pressure compressor 18 is coupled to high pressure shaft 24 and disposed upstream of combustor 20. High pressure turbine 22 is disposed downstream of combustor 20 and is coupled to and drives high pressure compressor 18 via high pressure shaft 24.

The aforementioned components are arranged in flow communication. Thus, gas passing through high pressure spool 12 is compressed by high pressure compressor 18 and is then is mixed with fuel and ignited in combustor 20 to generate hot combustion gases that flow past and turn high pressure turbine 22 (which turns high pressure compressor 18).

Low pressure spool 14 acts to drive fan 36 to produce a substantial amount of thrust for gas turbine engine 10. Fan 36 is coupled to low pressure turbine 26 via low pressure shaft 28. In the embodiment shown in FIG. 1, low pressure turbine 26 drives fan 36 via fan drive gear system 32 and fan shaft 34. Additionally, low pressure turbine 26 drives low pressure compressor 30 via low pressure shaft 28.

The aforementioned components are arranged in flow communication. Thus, gas passing through low pressure spool 14 is compressed by low pressure compressor 30 and is then is mixed with fuel and ignited in combustor 20 to generate hot combustion gases that flow past and turn low pressure turbine 26 (which turns low pressure compressor 30 and fan 36).

FIG. 1 illustrates some of the elements of fan drive gear system 32. As will be discussed in further detail subsequently, sun gear 38, planet gears 40, and ring gear 42 interact with one another to transfer torque, power, and speed and couple shafts 28 and 34.

More particularly, in the embodiment shown, low pressure spool 14 rotationally drives low pressure shaft 28 to which sun gear 38 (input) is mounted. Planet gears 40 are arranged circumferentially about and intermesh with sun gear 38. Ring gear 42 surrounds and intermeshes with planet gears 40. In the embodiment shown in FIG. 1, ring gear 42 rotationally drives fan shaft 34 and fan 36. In other embodiments, the epicyclic gear train configuration can be altered and planet gears 40 can drive fan shaft 34 and fan 36.

Figure 2:
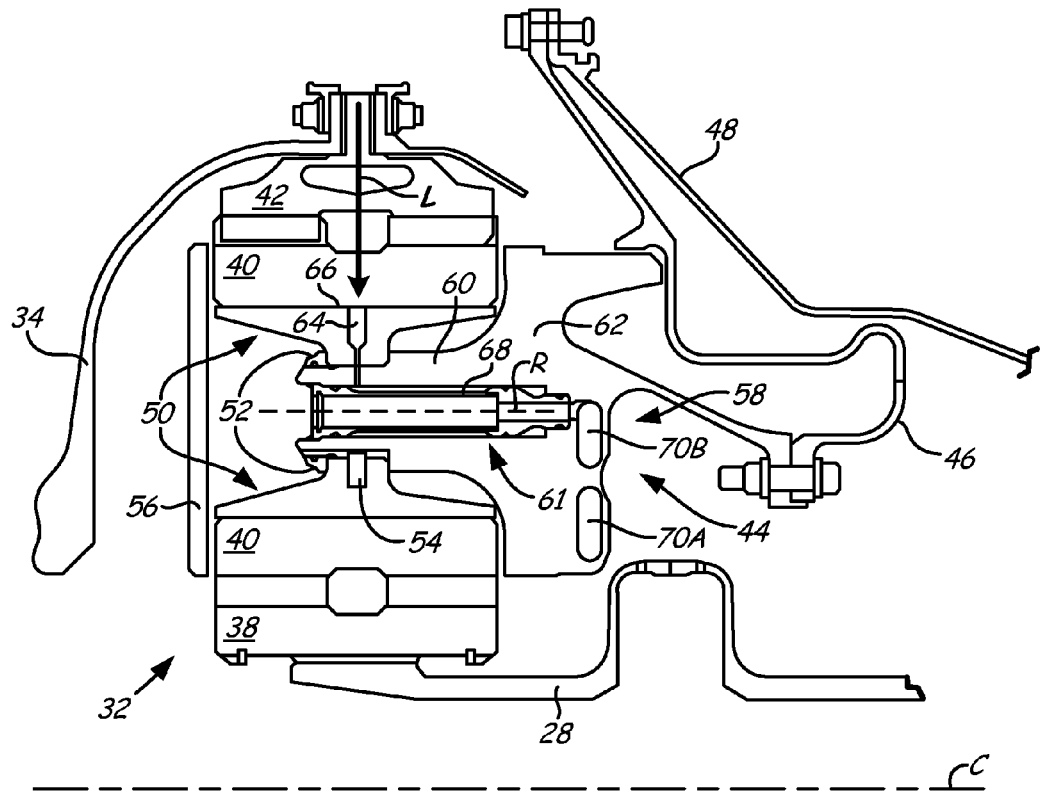
FIG. 2 are cross-sectional views of a fan drive gear system mounted in the gas turbine engine of FIG. 1.
Figure 2:
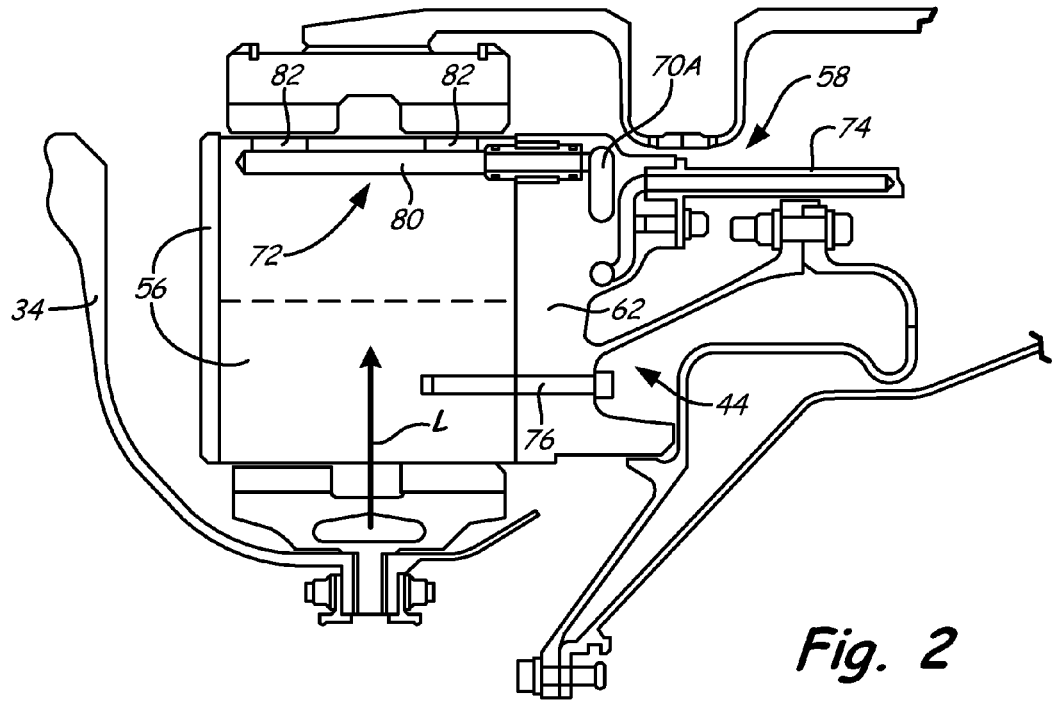

FIG. 2 shows cross-sectional views of fan drive gear system 32. In addition to sun gear 38, planet gears 40, and ring gear 42, fan drive gear system 32 includes torque frame 44, support structure 46, bearing compartment case 48, journal bearing 50, nut 52, locating feature 54, oil baffle 56, and oil transfer system 58. Torque frame 44 includes arms 60, a central cavity 61, and a base 62. Each journal bearing 50 includes radial passage 64 and circumferential recess 66. In addition to utilizing central cavity 61, oil transfer system 58 includes filter 68, first and second manifolds 70A and 70B, a spray bar 72, and a feed tube 74.

As previously discussed, in the embodiment shown in FIG. 2 planet gears 40 are permitted to rotate about their respective rotational axes but do not rotate about the rotational axis of sun gear 38. Ring gear 42 is coupled to fan shaft 34 and rotationally drives fan 36 (FIG. 1).

In the embodiment shown in FIG. 2, torque frame 44 is a unitary one-piece structure that is affixed to the stator support structure 46 within bearing compartment case 48. Support structure 46 is affixed at one axial end to bearing compartment case 48 by fasteners and interfaces with and can support an outer radial portion of torque frame 44. Journal bearing 50 is mounted on an outer axial end of torque frame 44 and is abutted axially by nut 52. Locating feature 54 such as a dowel pin or keyway is disposed between journal bearing 50 and torque frame 44. Oil baffle 56 is disposed adjacent to journal bearing 50 and planet gears 40. As shown in the cross-section of FIG. 2 taken below axis C, oil baffle 56 is secured to torque frame 44 by fasteners 76. Oil transfer system 58 extends externally to and internally though torque frame 44 to fluidly communicate with journal bearing 50 and planet gears 40.

Support structure 46 is connected to torque frame 44 to prevent rotation of torque frame 44 about the centerline axis C (additionally centerline axis C aligns with rotational axis of sun gear 38 and low pressure shaft 28). However, in other embodiments, such as a planetary gear configuration, torque frame 44 would rotate about the rotational axis C and ring gear 42 would be coupled to a fixed structure.

Bearing compartment case 48 contains and houses fan drive gear system 32. Together, each arm 60 of torque frame 44 and each journal bearing 50 illustrated in FIG. 2 provide a structure upon which one planet gear 40 can rotate. Although only one planet gear 40 and journal bearing 50 are illustrated in the cross-sections taken in FIG. 2, fan drive gear system 32 typically has a plurality of journal bearings 50 which correspondingly support a plurality of planet gears 40. The journal bearings 50 are circumferentially spaced on several arms 60 of torque frame 44.

Nut 52 is disposed around torque frame 44 near the axial end and secures journal bearing 50 to torque frame 44. Locating feature 54 orients journal bearing 50 relative to torque frame 44 so as to allow for a desired alignment of lubricant passages (part of oil transfer system 58) in order to allow for a flow of a lubricant (such as oil) to reach desired surfaces of fan drive gear system 32. For example, lubricant passages are aligned to allow lubricant to pass to the outer surface of journal bearing 50 which interfaces with planet gear 40. Additionally, oil transfer system 58 and the oil baffle 56 allow for a supply of lubricant to reach gears 38, 40, and 42 of fan drive gear system 32.

Although only one arm 60 is shown in FIG. 2, torque frame 44 includes multiple arms 60 integral with and extending generally axially (with respect to axis C) from base 62. Central cavity 61 is disposed within arms 60 and has an axial end with a fitting disposed therein to seal central cavity 61. Central cavity 61 extends generally axially through each arm 60 and base 62. Central cavity 61 generally aligns with the rotational axis R for planet gear 40 (which is also an axis of symmetry of arm 60 of torque frame 44).

Each journal bearing 50 is supported on a corresponding arm 60. Journal bearing 50 is mounted by a press fit to arm 60 and is clamped thereto by nut 52, which forces the journal bearing 50 against a shoulder 88 (FIGS. 3A and 3B) of torque frame 44.

Figure 3A:
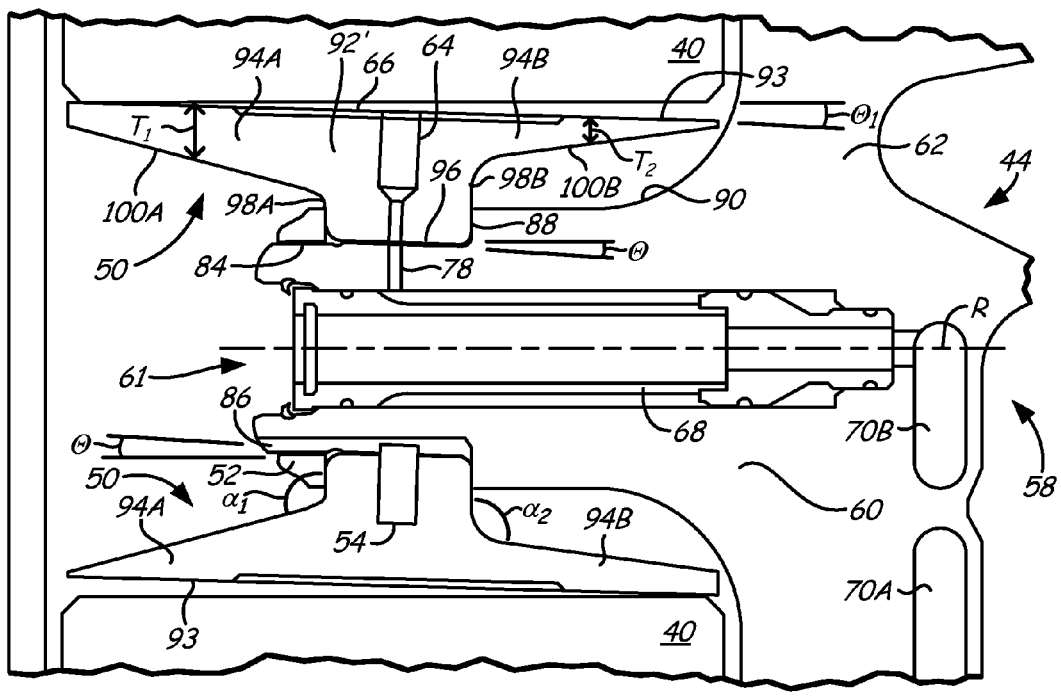
FIG. 3A is an enlarged cross-sectional view of a portion of the fan drive gear system illustrated in FIG. 2 in a non-loaded condition.
Figure 3B:
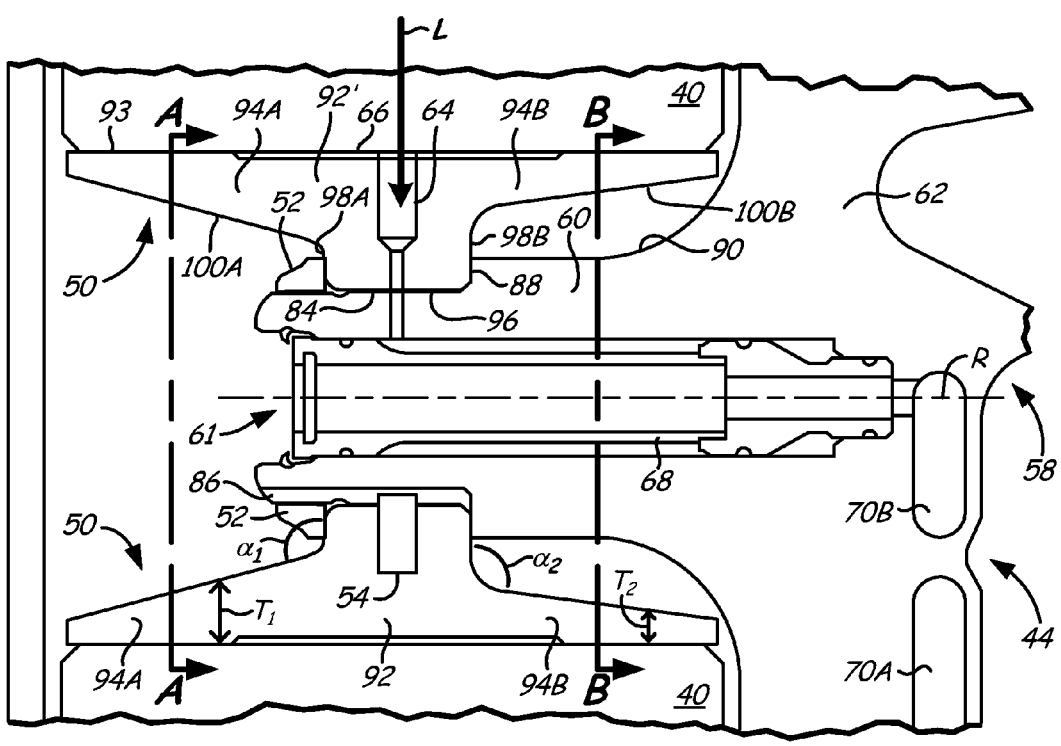
FIG. 3B is an enlarged cross-sectional view of a portion of the fan drive gear system illustrated in FIG. 2 in a loaded condition.

In the embodiment shown in FIGS. 3A and 3B, radial passage 64 is aligned with a passage 78 extending generally radially through torque frame 44 (passage 78 is part of oil transfer system 58). Radial passage 64 extends generally radially through journal bearing 50 and communicates with circumferential recess 66, which extends along an outer surface of journal bearing 50 between journal bearing 50 and planet gear 40.

Generally radial passage 78 (FIGS. 3A and 3B) communicates with central cavity 61 which houses filter 68. Central cavity 61 communicates with first and second manifolds 70A and 70B via a hollow fitting. First and second manifolds 70A and 70B are connected to spray bar 72 and feed tube 74, respectively. Spray bar 72 extends integrally within oil baffle 56. Spray bar 72 has an axial passage 80, which extends in a generally axial direction through oil baffle 56, and radial passages 82 that communicate with axial passage 80 and extend generally radially with respect to the axis R.

Feed tube 74 (only one is shown in FIG. 2) supplies oil to first and second manifolds 70A and 70B in the torque frame 56. Spray bar 72 communicates lubricant from manifold 70A through radial passages 82 to teeth of sun gear 38. Similarly, manifold 70B communicates with central cavity 61 to allow lubricant to pass through passages 78 and 64 to circumferential recess 66 between journal bearing 50 and planet gear 40.

FIG. 3A shows an enlarged cross-sectional view of a portion of the fan drive gear system 32 illustrated above axis C in FIG. 2 in a non-loaded condition. FIG. 3B shows an enlarged cross-sectional view of a portion of the fan drive gear system 32 illustrated above axis C in FIG. 2 in a load bearing condition. FIGS. 3A and 3B illustrate arm 60 of torque frame 44, which includes a first outer surface 84, a notch 86, a shoulder 88, and a second outer surface 90. First outer surface 84 has a bias angle $\theta$ relative to rotational axis R for planet gear 40. Journal bearing 50 includes a main body 92, an outer radial surface 93, a first wing 94A, and a second wing 94B. Main body 92 has an inner radial surface 96, a first shoulder 98A, and a second shoulder 98B. First wing 94A extends at an angle $\alpha_1$ relative to first shoulder 98A and second wing 94B extends at a second angle $\alpha_2$ relative to second shoulder 98B. First wing 94A has an inner surface 100A. Second wing 94B has a surface 100B.

First outer surface 84 extends from axial end of arm 60 to shoulder 88. First outer surface 84 abuts with and interfaces with either locating feature 54 or inner radial surface 96 of main body 92. An outer axial portion of first outer surface 84 is provided with threads adapted to thread onto nut 52. As shown in FIG. 3A, first outer surface 84 is provided with bias angle θ relative to rotational axis R for planet gear 40. Bias angle θ is exaggerated in FIG. 3A for illustrative purposes. The desired degree of bias angle θ relative to rotational axis R for planet gear 40 will vary from embodiment to embodiment and is load dependent and will therefore be determined by a structural analysis. In most embodiments, bias angle θ will be offset from rotational axis R for planet gear 40 (axis of arm 60) by less than one degree. In other embodiments, first outer surface 84 may not have bias angle θ but a bias angle may be provided on inner radial surface 96 or outer surface 93 of journal bearing 50.

Notch 86 is disposed in a portion of first outer surface 84. Notch 86 has one or more orifices that receive locating feature 54 (dowel pin) therein. Shoulder 88 extends generally radially relative to axis R between first outer surface 84 and second outer surface 90. Second outer surface 90 extends adjacent second wing 94A from shoulder 88 to base 62. Second outer surface 90 provides for a smooth transition from arm 60 to base 62.

Main body 92 forms radial passage 64 and houses locating feature 54. Inner radial surface 96 of main body 92 interfaces with and mounts on first outer surface 84 and locating feature 54. In the embodiment shown in unloaded condition of FIG. 3A, inner radial surface 96 is not provided with a bias angle or a complementary angle to that of bias angle θ of first outer surface 84, and therefore, the entire journal bearing 50 is tilted axially from forward end to aft end (i.e. the outer radial extent of journal bearing 50 along outer radial surface 93 decreases in radial extent from forward end to aft end). Thus, outer radial surface 93 (as well as inner radial surface 96) does not align with, and therefore, is not parallel to rotational axis R for planet gear 40 (which shown in both FIGS. 3A and 3B in the same an operational loaded position) but is offset by an angle $\theta_1$ that is identical to or substantially similar to bias angle θ.

As shown in FIG. 3B, when load L is applied through fan drive gear system 32 from fan shaft 34 to journal bearing 50, the axial tilt (non-alignment of the outer radial surface 93 and inner radial surface 96 with respect to rotational axis R for planet gear 40) of journal bearing 50 is eliminated. Thus, cantilever bending of the torque frame 44 under load L is accounted for and rotational axis R of planet gear 40 generally aligns with and is parallel to the axis of symmetry of torque frame 44. Additionally, rotational axis R of planet gear 40 is generally parallel to rotational axis C of sun gear 38 and low pressure shaft 28.

As shown in FIGS. 3A and 3B, first wing 94A extends from main body 92 in a forward axial direction. First wing 94A is spaced apart from arm 60 and interfaces with planet gear 40 along outer radial surface 93. Similarly, second wing 94B extends from main body 92 in a rearward axial direction (as defined by the direction flow through the engine indicated by arrow A (FIG. 1)). Second wing 94B is spaced apart from arm 60 and interfaces with planet gear 40 along outer radial surface 93. In the embodiment shown in FIGS. 3A and 3B, first wing 94A has a generally greater thickness $T_1$ from main body 92 to forward axial end than second wing 94B has from main body 92 to rearward axial end. Thus, thickness $T_1$ of first wing 94A is generally greater than the thickness $T_2$ of second wing 94B.

First shoulder 98A is abutted by nut 52 and extends generally radially between inner radial surface 96 and first wing 94A. More particularly, first shoulder 98A provides a transition between inner radial surface 96 and inner surface 100A. Together the transition between first shoulder 98A and inner surface 100A form first angle $\alpha_1$.

Second shoulder 98B abuts shoulder 88 of torque frame 44 and extends generally radially between inner radial surface 96 and second wing 94B. Second shoulder 98B provides a transition between inner radial surface 96 and inner surface 100B. Together the transition between second shoulder 98B and inner surface 100B form second angle $\alpha_2$. In the embodiment shown in FIGS. 3A and 3B, second shoulder 98B has a greater radial extent than first shoulder 98A. As a result of this configuration and the differing thicknesses $T_1$ and $T_2$ of wings 94A and 94B, first angle $\alpha_1$ differs from second angle $\alpha_2$. The desired thicknesses $T_1$ and $T_2$ of wings 94A and 94B and degree of angles $\alpha_1$ and will $\alpha_2$ vary from embodiment to embodiment and is load dependent and will therefore be determined by a structural analysis.

As disclosed in U.S. Pat. No. 6,964,155 by McCune et al., which is incorporated herein by reference, the asymmetric geometry of journal 50 (i.e., the different thicknesses $T_1$ and $T_2$ of wings 94A and 94B and different angles $\alpha_1$ and $\alpha_2$ give journal bearing 50 a different stiffness for forward portion (comprising first wing 94A) than aft portion (comprising second wing 94B). The different stiffness of journal bearing 50 from forward to aft allows journal bearing 50 to deflect by different amounts when load L is applied (FIG. 3B). Thus, forward portion of journal bearing 50 bends at a different rate than aft portion so as to better align (make parallel) the entire length of outer radial surface 93 with rotational axis R of planet gear 40 (axis of arm 60) and rotational axis C of sun gear 38 and low pressure shaft 28. Thus, the arrangement disclosed herein not only reduces the weight of fan drive gear system 32 by eliminating a carrier which supports the plurality of journal bearings 50 at either end but additionally reduces wear between the surfaces of torque frame 44 and journal bearing 50 and journal bearing 50 and planet gear 40.

Figure 4A:
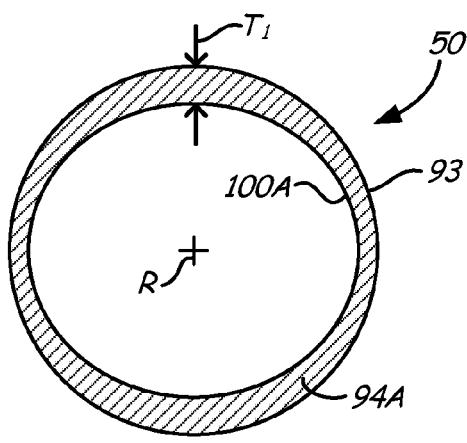
FIG. 4A is a first cross-sectional view of a journal bearing of the fan drive gear system taken along section A-A in FIG. 3B.
Figure 4B:
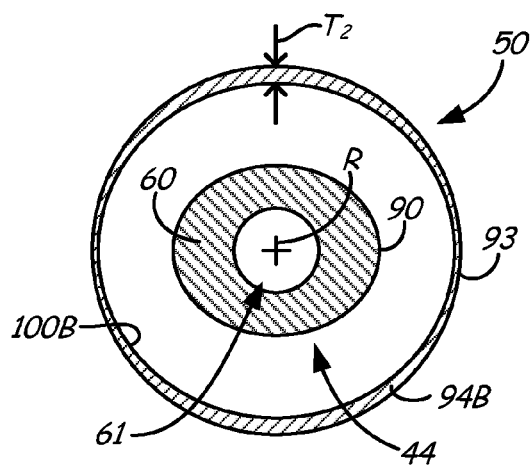
FIG. 4B is a second cross-sectional view of a torque frame and a journal bearing of the fan drive gear system taken along section B-B in FIG. 3B.

FIG. 4A shows a first cross-sectional view of journal bearing 50 taken along section A-A in FIG. 3B. FIG. 4B shows a second cross-sectional view of torque frame 44 and journal bearing 50 taken along section B-B in FIG. 3B.

As shown in FIG. 4A, outer radial surface 93 of first wing 94A is generally circular in shape around the outer circumference of journal bearing 50. However, inner surface 100A of first wing 94A has an elliptical shape, which gives first wing 94A a varying thickness $T_1$ about the circumference of journal bearing 50. The varying thickness $T_1$ provides a desired stiffness for the leading portion of journal bearing 50 and achieves a desired deflection for leading portion of journal bearing 50 when load L (FIG. 3B) is applied during operation.

As shown in FIG. 4B, outer radial surface 93 of second wing 94B is generally circular in shape around the outer circumference of journal bearing 50. However, inner surface 100B of second wing 94B has an elliptical shape, which gives second wing 94B a varying circumferential thickness $T_2$ about journal bearing 50. The varying thickness $T_2$ provides a desired stiffness for the aft portion of journal bearing 50 and achieves a desired deflection for aft portion of journal bearing 50 when load L (FIG. 3B) is applied during operation. Additionally, second outer surface 90 (and first outer surface 84) of arm 60 can have an elliptical shape in order to provide a desired stiffness for torque frame 44.

FIGS. 4A and 4B illustrate the different thicknesses $T_1$ and $T_2$ of wings 94A and 94B. In particular, thickness $T_1$ can not only vary as first wing 94A extends axially forward to forward axial end of journal bearing 50 (FIG. 3B), but thickness $T_1$ of first wing 94A can also vary circumferentially around axis R. Similarly, thickness $T_2$ can not only vary as second wing 94B extends axially aft to aft axial end (FIG. 3B) but thickness $T_2$ of second wing 94B can vary circumferentially around axis R. As previously discussed, thicknesses $T_1$ and $T_2$ of wings 94A and 94B differ from one another around the entire circumference of journal bearing 50 in the embodiment shown in FIGS. 4A and 4B. In other embodiments, thicknesses $T_1$ and $T_2$ of wings 94A and 94B can be substantially identical around at least a portion of the circumference of journal bearing 50.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A fan drive gear system for a gas turbine engine, comprising:
   a torque frame having an arm extending therefrom, the arm providing an axis;
   a journal bearing mounted on the arm and having an outer circumferential surface;
   a planet gear supported on the journal bearing for rotation about a rotational axis which substantially aligns with and is parallel to the axis of the arm;
   a sun gear located radially inward from and intermeshing with planet gear, the sun gear coupled to a low pressure shaft of the gas turbine engine; and
   a ring gear arranged about and intermeshing with the planet gear, the ring gear coupled to a fan shaft of the gas turbine engine;
   wherein when the fan drive gear system is in an unloaded condition the outer circumferential surface of the journal bearing is disposed at an angle that is non-parallel with respect to the axis of the arm, and wherein when the fan drive gear system is in a loaded condition the outer circumferential surface of the journal bearing is disposed substantially parallel with respect to the axis of the arm.

2. The fan drive gear system of claim 1, wherein the arm has an outer surface that forms a bias angle with respect to the axis of the arm.

3. The fan drive gear system of claim 2, wherein the angle of the outer surface of the journal bearing is substantially parallel to the bias angle of the outer surface of the arm.

4. The fan drive gear system of claim 1, wherein the journal bearing comprises:
   a main body having an inner radial surface that interfaces with the arm;
   a first wing extending from a first side of the main body; and
   a second wing extending from a second opposing side of the main body, the first and second wings being asymmetric with respect to one another.

5. The fan drive gear system of claim 4, wherein the asymmetry is a result of the first wing having a thickness that exceeds a thickness of the second wing along a corresponding axial and/or circumferential dimension.

6. The fan drive gear system of claim 5, wherein the thickness of the first wing and the thickness of the second wing vary circumferentially about the journal bearing.

7. The fan drive gear system of claim 5, wherein the thickness of the first wing along an axial length from the main body to a forward end exceeds the thickness of the second wing along a corresponding axial length from the main body to an aft end.

8. The fan drive gear system of claim 4, wherein the asymmetry is a result of the first wing extending from the main body at a first angle that differs from a second angle formed by the second wing extending from the main body.

9. The fan drive gear system of claim 1, wherein the torque frame is supported at a first end by a stator structure and is unsupported by a fixed structure at a second end.

10. A fan drive gear system for a gas turbine engine, comprising:
    a torque frame having an arm extending therefrom, the arm providing an axis;
    a journal bearing mounted on the arm, the journal bearing including a main body having an inner radial surface that interfaces with the arm, a first wing extending from a first side of the main body, and a second wing extending from a second opposing side of the main body, the first and second wings being asymmetric with respect to one another;
    a planet gear supported on the journal bearing for rotation about a rotational axis which substantially aligns with and is parallel to the axis of the arm;
    a sun gear located radially inward from and intermeshing with planet gear, the sun gear coupled to a low pressure shaft of the gas turbine engine; and
    a ring gear arranged about and intermeshing with the planet gear, the ring gear coupled to a fan shaft of the gas turbine engine.

11. The fan drive gear system of claim 10, wherein the asymmetry is a result of the first wing having a thickness that exceeds a thickness of the second wing along a corresponding axial and/or circumferential dimension.

12. The fan drive gear system of claim 11, wherein the thickness of the first wing and the thickness of the second wing vary circumferentially about the journal bearing.

13. The fan drive gear system of claim 11, wherein the thickness of the first wing along an axial length from the main body to a forward end exceeds the thickness of the second wing along a corresponding axial length from the main body to an aft end.

14. The fan drive gear system of claim 10, wherein the asymmetry is a result of the first wing extending from the main body at a first angle that differs from a second angle formed by the second wing extending from the main body.

15. The fan drive gear system of claim 10, wherein the journal bearing has an outer circumferential surface, and wherein when the fan drive gear system is in an unloaded condition the outer circumferential surface is disposed at an angle that is non-parallel with respect to the axis of the arm, and wherein when the fan drive gear system is in a loaded condition the outer circumferential surface is disposed substantially parallel with respect to the axis of the arm.

16. A gas turbine engine comprising:
    a low pressure turbine;
    a low pressure shaft coupled to the low pressure turbine; and
    a fan drive gear system coupled to the low pressure shaft, the fan drive gear system having a journal bearing mounted to an arm of a torque frame; at least one of the journal bearing and torque frame configured to have one or more features that account for a deflection of the fan drive gear system in a loaded condition to align an outer surface of the journal bearing with an axis of the arm; a planet gear supported on the journal bearing for rotation about a rotation axis which substantially aligns with and is parallel to the axis of the arm; a sun gear located radially inward from and intermeshing with the planet gear, the sun gear coupled to the low pressure shaft; and a ring gear arranged about an intermeshing with the planet gear, the ring gear coupled to a fan shaft of the gas turbine engine.

17. The gas turbine engine of claim 16, wherein the one or more features comprises the journal bearing having a main body with an inner radial surface that interfaces with the arm, a first wing extending from a first side of the main body, and a second wing extending from a second opposing side of the main body, the first and second wings being asymmetric with respect to one another.

18. The gas turbine engine of claim 17, wherein the asymmetry is a result of the first wing having a thickness that exceeds a thickness of the second wing along a corresponding axial and/or circumferential dimension.

19. The gas turbine engine of claim 16, wherein the one or more features comprises the journal bearing having an outer circumferential surface, and wherein when the fan drive gear system is in an unloaded condition the outer circumferential surface is disposed at an angle that is non-parallel with respect to the axis of the arm, and wherein when the fan drive gear system is in the loaded condition the outer circumferential surface is disposed substantially parallel with respect to the axis of the arm.

\* \* \* \* \*